US012587122B2

(12) United States Patent
Peng et al.

(10) Patent No.: US 12,587,122 B2
(45) Date of Patent: Mar. 24, 2026

(54) ELECTRIC DRIVE SYSTEM WITH ELECTRIC MACHINE HAVING STATIONARY ROTOR POWER TRANSFER

(71) Applicant: GM GLOBAL TECHNOLOGY OPERATIONS LLC, Detroit, MI (US)

(72) Inventors: Peng Peng, Columbus, OH (US); Lei Hao, Troy, MI (US); Suresh Gopalakrishnan, Troy, MI (US); Dongxu Li, Troy, MI (US); Renato Amorim Torres, Pontiac, MI (US); Yilun Luo, Ann Arbor, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 18/527,514

(22) Filed: Dec. 4, 2023

(65) Prior Publication Data

US 2025/0183833 A1     Jun. 5, 2025

(51) Int. Cl.
| | |
|---|---|
| *H02P 25/22* | (2006.01) |
| *B60L 50/51* | (2019.01) |
| *B60L 50/60* | (2019.01) |
| *B60L 53/24* | (2019.01) |
| *H02P 27/06* | (2006.01) |

(52) U.S. Cl.
CPC .............. *H02P 25/22* (2013.01); *B60L 50/51* (2019.02); *B60L 50/60* (2019.02); *B60L 53/24* (2019.02); *H02P 27/06* (2013.01); *B60L 2210/30* (2013.01); *B60L 2210/40* (2013.01)

(58) Field of Classification Search
CPC .......... H02P 25/22; H02P 27/06; B60L 50/51; B60L 50/60
See application file for complete search history.

(56) References Cited

U.S. PATENT DOCUMENTS

| | | | | |
|---|---|---|---|---|
| 2015/0061567 A1* | 3/2015 | Gorka | ..................... | H02P 25/22 |
| | | | | 323/282 |
| 2017/0310263 A1* | 10/2017 | Namuduri | ............. | H02P 25/022 |

FOREIGN PATENT DOCUMENTS

| | | | |
|---|---|---|---|
| DE | 102010043492 A1 | 5/2012 |
| DE | 102018127007 A1 | 5/2019 |
| DE | 102021211998 A1 | 4/2023 |
| DE | 102021212145 A1 | 4/2023 |
| DE | 102022127468 A1 | 11/2023 |

* cited by examiner

*Primary Examiner* — Muhammad S Islam
(74) *Attorney, Agent, or Firm* — Quinn IP Law

(57) ABSTRACT

An electric drive system includes an electric machine having a stator assembly and a rotor assembly. The stator assembly has a plurality of multi-phase stator windings, including a first stator winding and a second stator winding. A first inverter is adapted to feed the first stator winding. A second inverter is adapted to feed the second stator winding. The electric machine is a wound rotor machine, with a respective frequency of an alternating current (AC) in the rotor assembly being synchronized with the respective frequency of the AC in the stator assembly. The rotor assembly includes a multi-phase rotor windings. The electric machine is configured such that power transfer between the first stator winding and the second stator winding is achieved when the rotor assembly is stationary.

12 Claims, 5 Drawing Sheets

ELECTRIC DRIVE SYSTEM WITH ELECTRIC MACHINE HAVING STATIONARY ROTOR POWER TRANSFER

INTRODUCTION

The disclosure relates generally to an electric drive system having an electric machine. More specifically, the disclosure relates generally to an electric drive system having power transfer occurring between stator windings while the rotor is stationary. An electric machine generally includes a stator having a plurality of stator windings and a rotor rotatable within the stator. In a generator mode, the rotation of the rotor induces voltage in the stator winding, which powers an external load. Alternately, if an electric current is passed through the stator windings, the energized windings cause the rotor to rotate, and the machine will perform as a motor. In a synchronous electric machine, the stator magnetic field and the rotor magnetic field are locked together and rotate at the same speed. Power transfer topologies of electric machines generally employ direct current excitation on the rotor, which may be accomplished for example, with a permanent magnet or a single-phase field winding. Maintaining synchronization between the rotor and stator fields requires that the rotor be spinning during the power transfer. Additionally, a mechanical clutch is needed to decouple the electric machine from the axle during power transfer.

SUMMARY

Disclosed herein is an electric drive system having an electric machine with a stator assembly and a rotor assembly. The stator assembly has a plurality of multi-phase stator windings, including a first stator winding and a second stator winding. A first inverter is adapted to feed the first stator winding. A second inverter is adapted to feed the second stator winding. The rotor assembly includes multi-phase rotor windings, with the respective frequency of an alternating current (AC) in the rotor assembly being synchronized with the respective frequency of the AC in the stator assembly. The electric machine is configured such that power transfer between the first stator winding and the second stator winding is achieved when the rotor assembly is stationary.

In one embodiment, the rotor assembly includes exactly two multi-phase rotor windings, including a first phase coil and a second phase coil. Here, the first phase coil and the second phase coil define respective currents forming a combined rotating AC current vector, with the respective currents of the first phase coil and the second phase coil being 90 electrical degrees apart. In another embodiment, the multi-phase rotor windings has exactly three phases, with a first phase coil, a second phase coil, and a third phase coil. The first phase coil, the second phase coil, and the third phase coil may define respective currents forming a combined rotating AC current vector, with the respective currents of the first phase coil, the second phase coil, and the third phase coil being 120 electrical degrees apart.

The electric drive system may include a controller having a processor and a tangible, non-transitory memory on which instructions are recorded. The first and second phase coils are arranged relative to a plurality of circuit legs each having a respective first switch and a respective second switch. The controller is adapted to modulate a phase and an amplitude of the combined rotating current vector through controlling a respective state of the respective first switch and the respective second switch.

A vehicle battery may be selectively electrically coupled with the first stator winding, with the battery providing power to the first stator winding during a propulsion mode of the vehicle. An external energy source may be selectively electrically coupled with the second stator winding, the external energy source including at least one of a vehicle-to-load connection, a vehicle-to-house connection, and a vehicle-to grid connection. During a charging mode of the vehicle, the second stator winding is adapted to consume energy from the external energy source, the power transfer occurs from the second stator winding to the first stator winding, and the first stator winding is adapted to provide power to the vehicle battery.

In some embodiments, the electric drive system may include a power source selectively couplable to the electric machine, the power source being adapted to transmit a direct current (DC) signal. A power converter may be adapted to receive the DC signal. Here, a high-frequency rotary transformer may be electrically coupled to the power converter, the high-frequency rotary transformer having a stationary portion and a rotating portion such that an alternating current (AC) in the stationary portion induces an AC voltage in the rotating portion. A rectifier is adapted to receive the AC voltage from the rotating portion of the high-frequency rotary transformer, the rectifier being adapted to convert the AC voltage to DC voltage. A DC bus may be adapted to store the DC voltage from the rectifier.

The electric drive system may include a two-phase inverter adapted to receive the DC voltage from the DC bus, the DC voltage being converted through into respective AC currents in the two-phase inverter. Here, the multi-phase rotor windings includes a first phase coil and a second phase coil adapted to receive the respective AC currents from the two-phase inverter for generation of a rotor field.

The electric drive system may include a three-phase inverter adapted to receive the DC voltage from the DC bus, the DC voltage being converted through into respective AC currents in the three-phase inverter. The multi-phase rotor windings includes first, second and third phase coils adapted to receive the respective AC currents from the three-phase inverter for generation of a rotor field.

A power source may be selectively couplable to the electric machine, the power source being adapted to transmit a DC signal. In one embodiment, a first DC-to-AC inverter and a second DC-to-AC inverter adapted to receive the DC signal for conversion to a respective AC current. A first slip ring device and a second slip ring device may be adapted to receive the respective AC current from the first DC-to-AC inverter and the second DC-to-AC inverter, the electric machine having a stationary side and a rotating side. The first slip ring device and the second slip ring device are positioned such that the respective AC current flows from the stationary side to the rotating side, the multi-phase rotor windings being adapted to receive the respective AC current for generation of a rotor field.

In another embodiment, a first DC-to-AC inverter and a second DC-to-AC inverter adapted to receive DC signal for conversion to a respective AC signal. A rotary transformer having respective dual nodes is adapted to receive the respective AC signal from the first DC-to-AC inverter and the second DC-to-AC inverter. The rotary transformer is adapted to transmit the respective AC signal to the multiphase rotor windings.

Disclosed herein is a vehicle with an electric drive system having an electric machine with a stator assembly and a rotor assembly. The stator assembly having a plurality of multi-phase stator windings, including a first stator winding and a second stator winding. A first inverter is adapted to feed the first stator winding, and a second inverter adapted to feed the second stator winding. The rotor assembly includes multi-phase rotor windings, a respective frequency of an alternating current (AC) in the rotor assembly being synchronized with the respective frequency of the AC in the stator assembly. The electric machine is configured such that power transfer between the first stator winding and the second stator winding is achieved when the rotor assembly is stationary.

The above features and advantages and other features and advantages of the present disclosure are readily apparent from the following detailed description of the best modes for carrying out the disclosure when taken in connection with the accompanying drawings.

Figure 1:
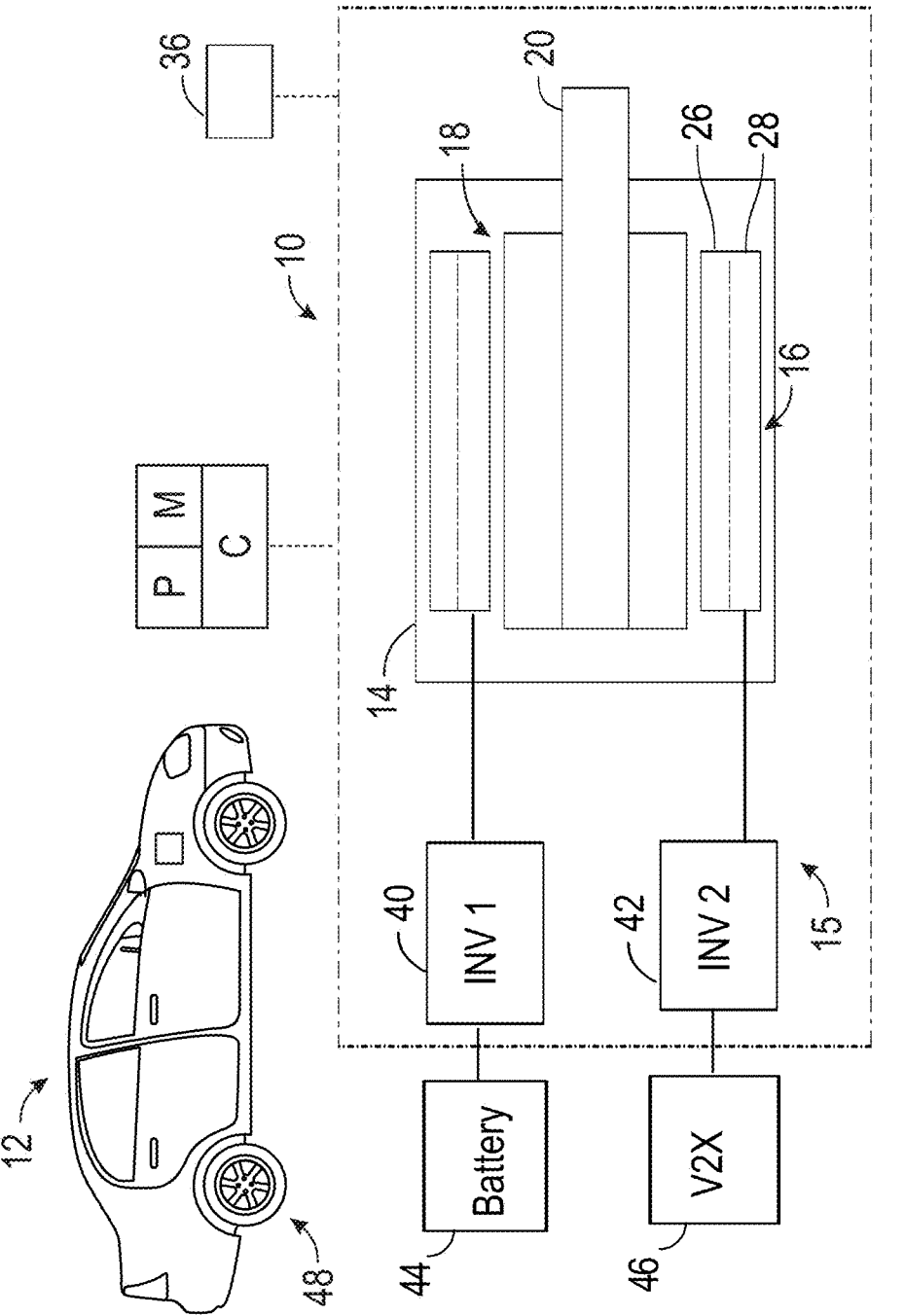
FIG. 1 is a schematic fragmentary block diagram of electric drive system having an electric machine and a plurality of inverters.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 is a schematic fragmentary diagram of an electric drive system 10, which may be part of a vehicle 12. The vehicle 12 may be a mobile platform, such as, but not limited to, a passenger car, sport utility vehicle, light truck, heavy duty vehicle, ATV, mini-van, bus, transit vehicle, bicycle, robot, farm implement, sports-related equipment, boat, plane, train or other device. The vehicle 12 may be partially or fully electric. The vehicle 12 may take many different forms and include multiple and/or alternate components and facilities.

The electric drive system 10 includes an electric motor/generator, referred to herein as electric machine 14, configured to generate torque and a plurality of power converters 15. Referring to FIG. 1, the electric machine 14 includes a stator assembly 16 positioned at least partially around a rotor assembly 18 having a rotor shaft 20. The electric machine 14 is a wound rotor machine.

Figure 2:
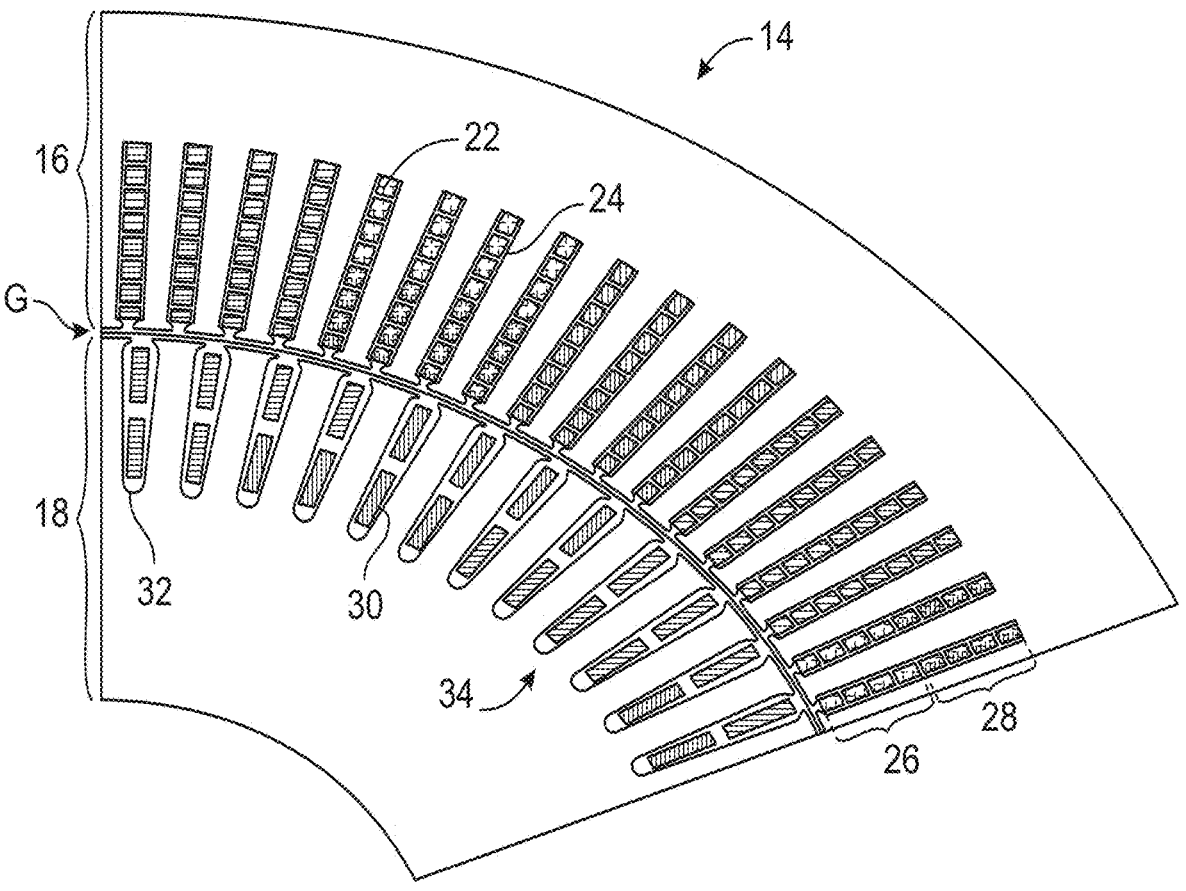
FIG. 2 is a schematic fragmentary sectional view through the electric machine of FIG. 1.

FIG. 2 is a schematic fragmentary sectional view through the electric machine 14. Referring to FIG. 2, the stator assembly 16 is spaced from the rotor assembly 18 by an air gap G. Referring to FIG. 2, the stator assembly 16 has respective conductors 22 extending through stator slots 24 and arranged in sets of windings. The stator assembly 16 has a plurality of multi-phase stator windings, including a first stator winding 26 and a second stator winding 28, shown in FIGS. 1-2. In other words, the stator assembly 16 has two windings and each winding has three phases.

Referring to FIG. 2, the rotor assembly 18 includes respective conductors 30 extending through rotor slots 32. The rotor assembly 18 has one winding with multiple phases (e.g., 2-phase, 3-phase etc.), referred to herein as multi-phase rotor windings 34. In some embodiments, the multi-phase rotor windings 34 include exactly two phases, with a first phase coil R1 and a second phase coil R2, shown in FIG. 3. The multi-phase rotor windings 34 may include exactly three phases, with a first phase coil R1, a second phase coil R2, and a third phase coil R3, shown in FIG. 4.

Motor-based power transfer strategies using synchronous electric machines generally require spinning of the rotor in order to synchronize the rotor field with the stator field. During power transfer, a mechanical clutch is needed to decouple the electric machine from the axle of the vehicle. As described below, the electric drive system 10 enables power transfer without requiring that the rotor spin in order to synchronize the rotor field with the stator field. Additionally, the electric drive system 10 removes the need for a mechanical clutch. The electric machine 14 is capable of rotor magnetic flux control using current flow in the rotor windings (arranged around the rotor shaft 20) in place of permanent magnets.

Various embodiments of the electric drive system 10 are shown in and described below with respect to FIGS. 3-8. Power transfer that does not require spinning of the rotor assembly 18 is referred to herein as "stationary-rotor power transfer," or "standstill power transfer." The electric drive system 10 enables bi-directional alternating current ("AC") power transfer at standstill, to and from the vehicle 12. As described below, the electric drive system 10 is configured such that a rotating rotor magnetic field vector is generated and synchronized with the stator magnetic field, allowing alternating current ("AC") power to be transferred between the two segmented stator windings without spinning the rotor assembly 18.

Referring to FIGS. 1-2, the stator assembly 16 has two sets of segmented multi-phase windings, with each set being fed by a separate inverter for independent current control. Referring to FIG. 1, the first stator winding 26 and the second stator winding 28 are fed by a first inverter 40 and a second inverter 42, respectively. The first stator winding 26 and the second stator winding 28 may be respectively electrically coupled with a vehicle battery 44 and an external energy source 46 (or power grid 46) during the standstill power transfer. The vehicle battery 44 provides power to the first stator winding 26 during propulsion mode. During charging mode, the first stator winding 26 (on the battery side) provides power to the battery 44. During charging mode, the second stator winding 28 (on the grid side) consumes power from the power grid 46; the power transfers from the grid-side stator winding (second stator winding 28 in FIG. 1) to the battery-side stator winding (first stator winding 26 in FIG. 1). The external energy source 46 may be a vehicle-to-load connection (V2L), a vehicle-to-house (V2H) connection, or a vehicle-to grid (V2G) connection. Referring to FIG. 1, the production of torque by the electric drive system 10 is subsequently transmitted to the wheels 48 of the vehicle 12.

Figure 3:
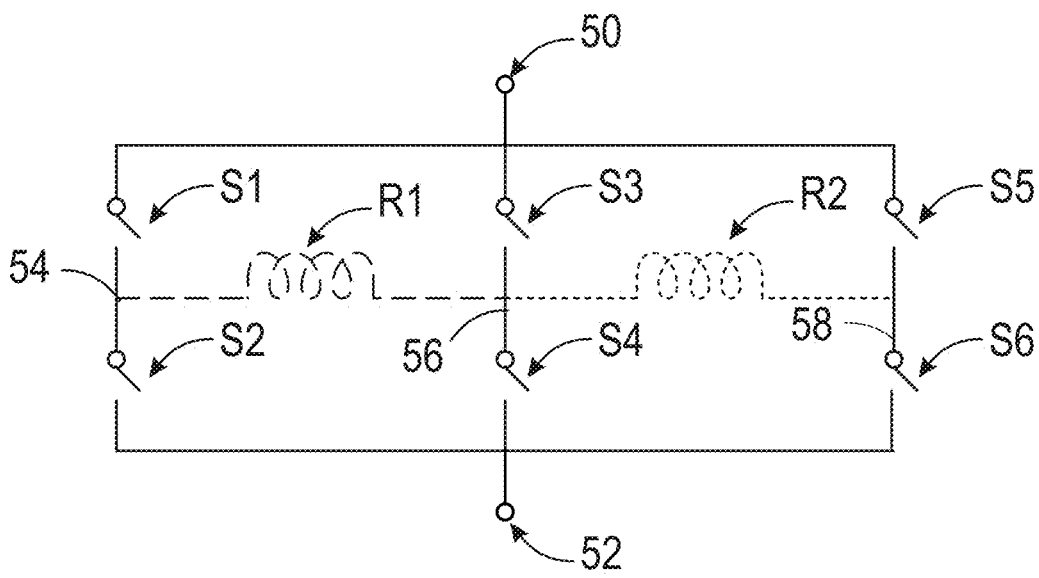
FIG. 3 is a schematic fragmentary diagram of example two-phase rotor windings employable in the electric machine of FIG. 1.

FIG. 3 is a schematic diagram of an example set-up for rotor windings 34 having exactly two phases, with first and second phase coils R1, R2. The first and second phase coils R1, R2, are arranged relative to multiple circuit legs that are connected between a positive node 50 and negative node 52. In the embodiment shown in FIG. 3, the circuit legs include a first leg 54, a second leg 56, and a third leg 58, each having a respective first switch S1, S3, S5 and a respective second switch S2, S4, S6.

The electric drive system 10 may employ two-phase or multi-phase inverters to generate a rotating current vector and magnetic field without spinning the rotor assembly 18. During power transfer, the multi-phase rotor windings 34 are excited with alternating current ("AC"). The respective currents of the first phase coil R1 and the second phase coil R2 are 90 electrical degrees apart, forming a combined rotating current vector.

The first and second phase coils R1, R2 generate a combined rotating current vector having a phase and amplitude that may be modulated through controlling the states of the respective first switch S1, S3, S5 and the respective second switch S2, S4, S6. In other words, a subset of three-phase space state vectors is employed to modulate the amplitude and phase of the winding voltage and generate a rotating rotor magnetic field. The frequency of the AC rotor current is synchronized with the frequency of the AC stator current. In such a way, the electric machine 14 keeps synchronization between the stator field and the rotor field for power transfer without having to spin the rotor assembly 18.

Referring to FIG. 1, the vehicle 12 includes a controller C having a processor P and tangible, non-transitory memory M on which instructions are recorded for controlling operation of the electric drive system 10 based on torque demand. The controller C may be adapted to modulate a respective state (ON/OFF) of the switches S1 through to S6. The set-up enables four different configurations (I, II, III, IV), shown in Table I below. Each respective leg may be in one of two states, a first state or a zero state. "State 0" indicates that the respective first switches (S1, S3, S5) are in an OFF state and the respective second switches (S2, S4, S6) are in an ON state. "State 1" indicates that the respective top switches (S1, S3, S5) are in an ON state and the respective bottom switches (S2, S4, S6) are in an OFF state. The first voltage (V1) and the second voltage (V2) in Table 1 indicate the input voltage to the first and second phase coils R1, R2, respectively, with the maximum input voltage being denoted by Vdc.

TABLE 1

| Configuration | State of Leg 54 | State of Leg 56 | State of Leg 58 | V1 | V2 |
|---|---|---|---|---|---|
| I | 1 | 0 | 0 | Vdc | 0 |
| II | 1 | 1 | 0 | 0 | Vdc |

TABLE 1-continued

| Configuration | State of Leg 54 | State of Leg 56 | State of Leg 58 | V1 | V2 |
|---|---|---|---|---|---|
| III | 0 | 1 | 1 | −Vdc | 0 |
| IV | 0 | 0 | 1 | 0 | −Vdc |

Figure 4:
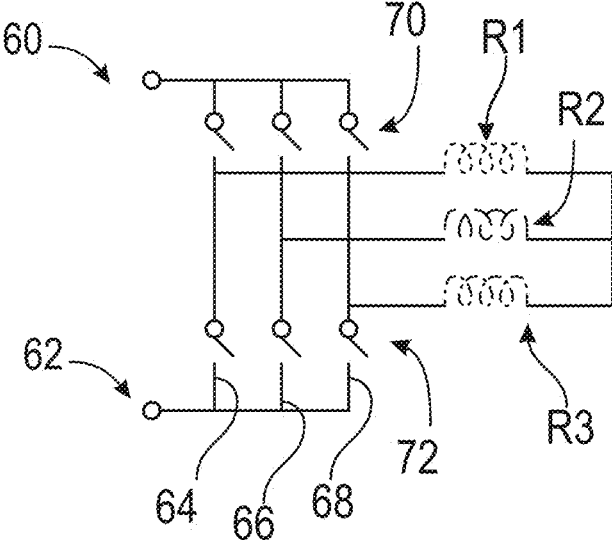
FIG. 4 is a schematic fragmentary diagram of example three-phase rotor windings employable in the electric machine of FIG. 1.

Another example configuration is shown in FIG. 4, where the rotor windings 34 has exactly three phases, with first, second and third phase coils R1, R2, R3. The first, second and third phase coils R1, R2, R3 are connected to respective circuit legs that are arranged between a positive node 60 and a negative node 62. The circuit legs include a first leg 64, a second leg 66, and a third leg 68. Referring to FIG. 4, each leg has a respective first switch 70 and a respective second switch 72. The first, second and third phase coils R1, R2, R3 are selected to be 120 electrical degrees apart from each other in space. The first, second and third phase coils R1, R2, R3 generate a combined rotating current vector having a phase and amplitude that may be modulated through controlling the states of the respective first and second switches 70, 72. Similar to the example shown in FIG. 3, the controller C is adapted to modulate the states (ON/OFF) of the respective first and second switches 70, 72 of the first leg 64, the second leg 66, and the third leg 68.

The turn number of the multi-phase rotor windings 34 may be selected such that the winding impedance is sufficiently high enough to keep a relatively low direct or alternating current during a propulsion mode of the vehicle 12. The turn number of the multi-phase rotor winding may be also properly selected such that the back-electromotive force of the multi-phase rotor windings 34 is lower than the predefined voltage limit at the desired frequency during power transfer or propulsion. The electric drive system 10 may be controlled such that the torque ripple during the standstill power transfer is lower than a predefined threshold to improve the life of other components, such as the gear unit 36. For example, the predefined threshold may be set to be between about 1 and 2 Nm (Newton-meters).

Figure 5:
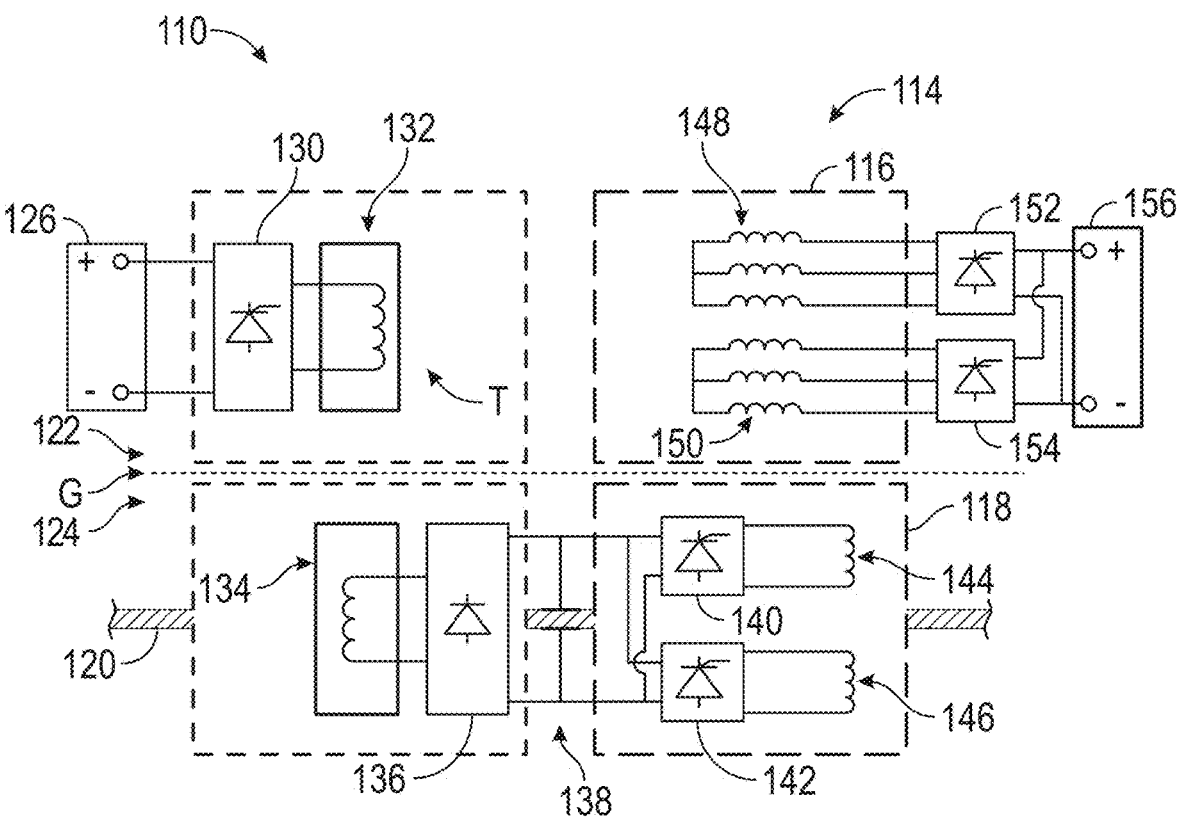
FIG. 5 is a schematic fragmentary diagram of the electric drive system of FIG. 1, in accordance with a first embodiment.

Referring now to FIG. 5, an electric drive system 110 in accordance with a first embodiment is shown. The electric drive system 110 includes an electric machine 114 with a stator assembly 116, and a rotor assembly 118 having a rotor shaft 120. The electric drive system 110 has a rotating side 122 and a stationary side 124, separated by an air gap G.

Referring to FIG. 5, a power source 126 (e.g., a high voltage battery) is selectively couplable to the electric drive system 110, and adapted to transmit a direct current (DC) signal to a power converter, such as DC-to-AC inverter 130. The DC-to-AC inverter 130 converts the DC signal to an AC signal, for transmission to a stationary portion 132 of a rotary transformer T. The rotary transformer T is adapted to couple electrical signals between two parts that rotate relative to one another, and may be a high-frequency rotary transformer. In one embodiment, the high-frequency rotary transformer has a working frequency exceeding about 10 kilo Hertz. The AC excitation in the stationary portion 132 induces voltage in a rotating portion 134 of the rotary transformer T, which is connected to a rectifier 136. The rectifier 136 converts the AC voltage and builds up DC voltage in a DC bus 138.

Referring to FIG. 5, the DC voltage from the DC bus 138 is converted through first and second inverters 140, 142 into AC current, and supplied to first and second phase coils 144, 146, resulting in the creation of a rotor field. The rotor field interacts with the stator field in the first and second stator windings 148, 150. Referring to FIG. 5, the first and second stator windings 148, 150 are fed by first and second inverters 152, 154 powered by an energy source 156. Interaction of the rotor field with the stator field results in the production of torque, subsequently transmitted to the wheels 48 of the vehicle 12. The example shown in FIG. 5 incorporates single wireless power transfer across the air gap G.

Figure 6:
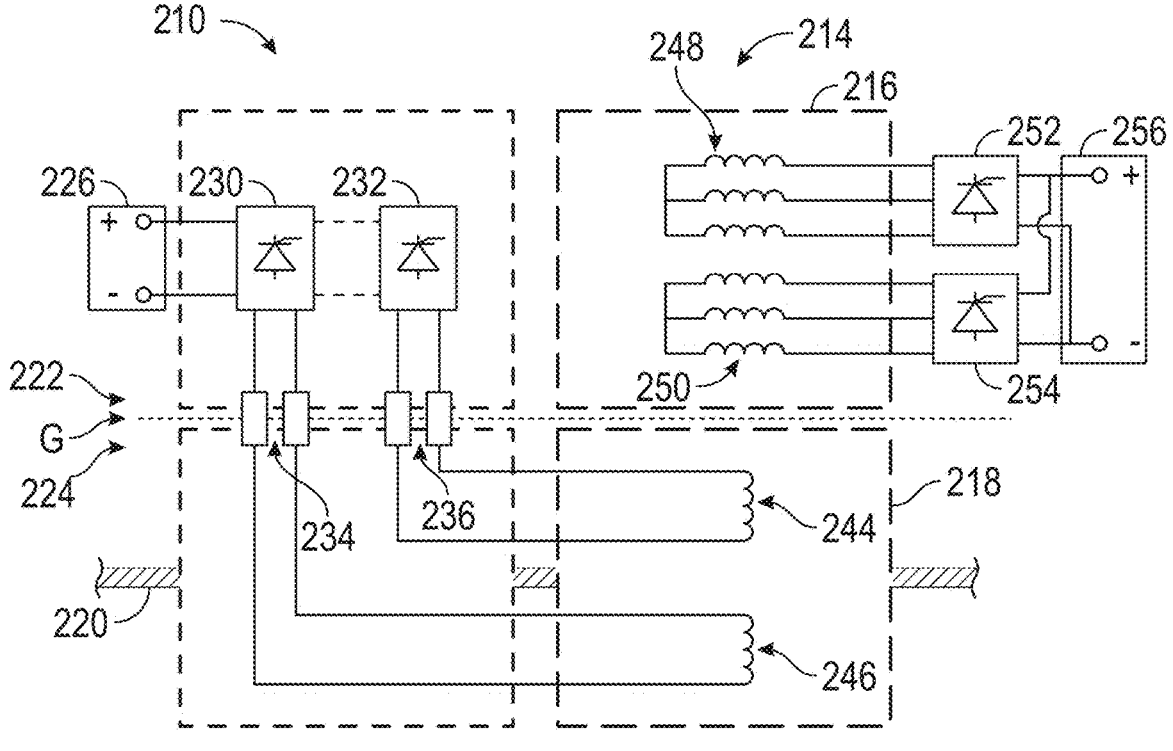
FIG. 6 is a schematic fragmentary diagram of the electric drive system of FIG. 1, in accordance with a second embodiment.

Referring now to FIG. 6, an electric drive system 210 in accordance with a second embodiment is shown. The electric drive system 210 includes an electric machine 214 with a stator assembly 216, and a rotor assembly 218 having a rotor shaft 220. The electric drive system 210 has a rotating side 222 and a stationary side 224, separated by an air gap G.

Referring to FIG. 6, a power source 226 (e.g., a high voltage battery) is selectively couplable to the electric drive system 210, and adapted to transmit a DC signal to a first inverter 230 and a second inverter 232, which convert it to an AC signal, respectively. The AC signal flows from the stationary side 224 to the rotating side 222 through mechanical contact power transfer in the form of slip ring devices 234, 236, which supply the AC signal to first and second phase coils 244, 246. The slip ring devices 234, 236 are employed to transmit power or electrical signals between a stationary component and a rotating component, and may also be referred to as rotary electrical joints, electric swivels, and collector rings. The slip ring devices 234, 236, may include one or more rotating rings and stationary brushes. The configuration of the slip ring devices 234, 236 may be varied based on the application.

The AC excitation in the first and second phase coils 244, 246 results in the creation of a rotor field which interacts with the stator field in the first and second stator windings 248, 250. Referring to FIG. 6, the first and second stator windings 248, 250 are fed by first and second inverters 252, 254 powered by an energy source 256. Interaction of the rotor field with the stator field results in the production of torque, subsequently transmitted to the wheels 48 of the vehicle 12.

Figure 7:
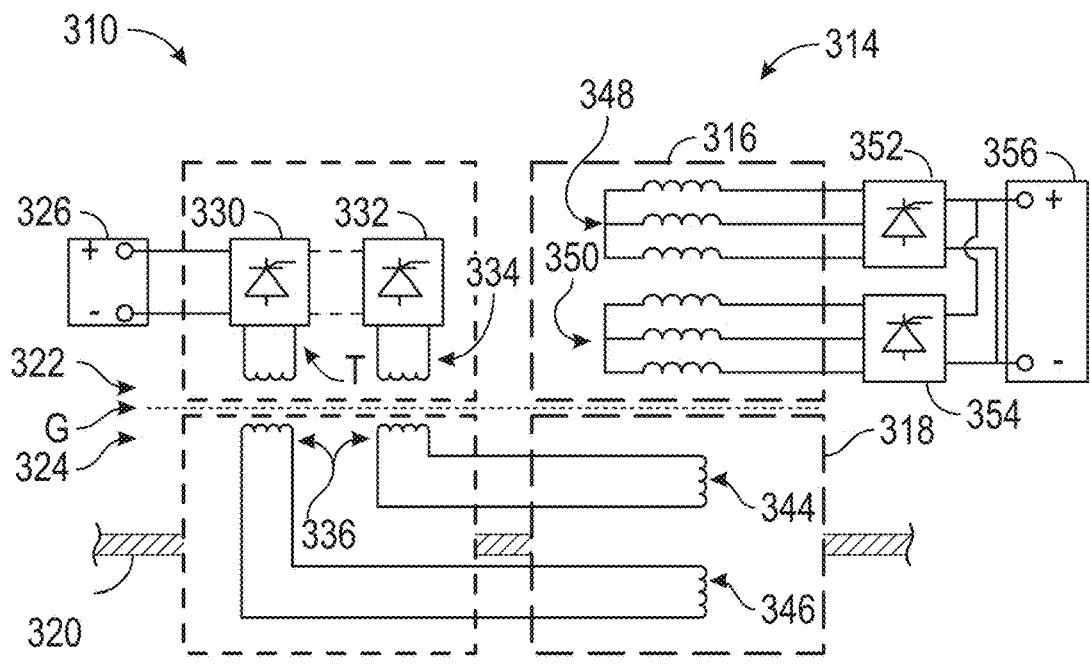
FIG. 7 is a schematic fragmentary diagram of the electric drive system of FIG. 1, in accordance with a third embodiment.

Referring now to FIG. 7, an electric drive system 310 in accordance with a third embodiment is shown. The electric drive system 310 includes an electric machine 314 with a stator assembly 316, and a rotor assembly 318 having a rotor shaft 320. The electric drive system 310 has a rotating side 322 and a stationary side 324, separated by an air gap G.

Referring to FIG. 7, a power source 326 (e.g., a high voltage battery) is selectively couplable to the electric drive system 310, and adapted to transmit a DC signal to a first DC-to-AC inverter 330 and a second DC-to-AC inverter 332, which convert it to an AC signal, for respective transmission to the stationary double nodes 334 of a rotary transformer T. The rotary transformer T may employ low-frequency AC excitation. The AC excitation in the stationary double nodes 334 induces AC voltage in the rotating double nodes 336 of the rotary transformer T, which are the supplied to the first and second phase coils 344, 346, resulting in the creation of a rotor field. Thus, the electric drive system 310 incorporates a double wireless power transfer across the air gap G.

The rotor field interacts with the stator field in the first and second stator windings 348, 350. Referring to FIG. 7, the first and second stator windings 344, 346 are fed by first and second inverters 352, 354 powered by an energy source 356. Interaction of the rotor field with the stator field results in the production of torque, subsequently transmitted to the wheels 48 of the vehicle 12.

Figure 8:
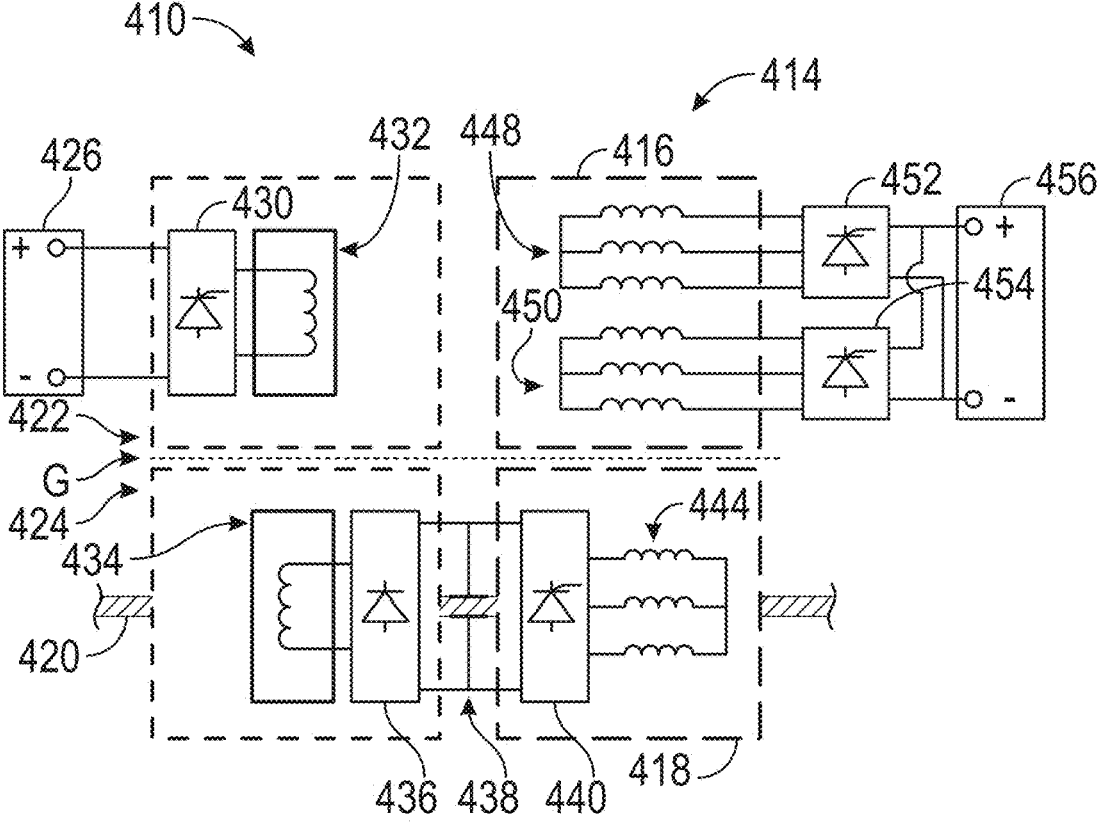
FIG. 8 is a schematic fragmentary diagram of the electric drive system of FIG. 1, in accordance with a fourth embodiment.

Referring now to FIG. 8, an electric drive system 410 in accordance with a fourth embodiment is shown. The fourth embodiment of FIG. 8 is similar to the first embodiment of FIG. 5, except for the presence of a three-phase rotor winding set 444. An example configuration of a three-phase rotor winding set is shown in FIG. 4. Referring to FIG. 8, the electric drive system 410 includes a wound-field electric machine with a stator assembly 416, and a rotor assembly 418 having a rotor shaft 420. The electric drive system 410 has a rotating assembly 422, and a stationary side 424 that are separated by an air gap G.

Referring to FIG. 8, a power source 426 (e.g., a high voltage battery) is selectively couplable to the electric drive system 410, and adapted to transmit a DC signal to a DC-to-AC inverter 430, which converts it to an AC signal, for transmission to a stationary portion 432 of a rotary transformer T. The rotary transformer T is adapted to couple electrical signals between two parts that rotate relative to one another, and may be a high-frequency rotary transformer. The AC excitation in the stationary portion 432 induces voltage in a rotating portion 434 of the rotary transformer T, which is connected to a rectifier 436. The rectifier 436 converts the AC voltage and builds up DC voltage in a DC bus 438.

Referring to FIG. 8, the DC voltage from the DC bus 438 is converted through a three-phase inverter 440 into AC current, and supplied to the three-phase rotor winding set 444, resulting in the creation of a rotor field. The three-phase rotor winding set 444 includes first, second and third phase coils R1, R2, R3 (shown in FIG. 4). The rotor field interacts with the stator field in the first and second stator windings 448, 450. The first and second stator windings 448, 450 are fed by first and second inverters 452, 454 powered by an energy source 456. Interaction of the rotor field with the stator field results in the production of torque.

In summary, various embodiments of an electric drive system 10 having an electric machine 14 are disclosed. The electric drive system 10 enables bi-directional AC power transfer to and from the vehicle 12 while the rotor assembly 18 is stationary. The electric drive system 10 may be configured to employ a high fundamental frequency for the standstill power transfer in order to increase the back-electromotive force and lower the current required to achieve high-efficiency high-power operation. In some embodiments, the rotor assembly 18 may be moved to the middle of the gear backlash before starting the power transfer to minimize effects on the gear unit 36 in the vehicle 12. For example, the rotor assembly 18 may be located within about 15 degrees of the gear lash.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description, are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric drive system for a vehicle, comprising:
an electric machine having a stator assembly and a rotor assembly, the stator assembly having a plurality of multi-phase stator windings, including a first stator winding and a second stator winding;
a first inverter adapted to feed the first stator winding;
a second inverter adapted to feed the second stator winding;
wherein the rotor assembly has multi-phase rotor windings, including a first phase coil and a second phase coil defining respective currents forming a combined rotating current vector, the respective currents being 90 electrical degrees apart;

a plurality of circuit legs operatively connected to the multi-phase rotor windings, each of the circuit legs having a respective first switch and a respective second switch;
a controller having a processor and a tangible, non-transitory memory on which instructions are recorded, the controller being adapted to modulate a phase and an amplitude of the combined rotating current vector through controlling a state of the respective first switch and the respective second switch;
wherein the electric machine is configured such that power transfer between the first stator winding and the second stator winding is achieved when the rotor assembly is stationary, by generating a rotor magnetic field that is synchronized with a stator magnetic field; and
wherein the multi-phase rotor windings are excited with alternating current (AC) and a respective frequency of an AC rotor current is synchronized with the respective frequency of an AC stator current, thereby maintaining synchronization between the stator magnetic field and the rotating rotor magnetic field for power transfer without spinning the rotor assembly.

2. The electric drive system of claim 1, further comprising:
a vehicle battery selectively electrically coupled with the first stator winding, the battery providing power to the first stator winding during a propulsion mode of the vehicle;
an external energy source selectively electrically coupled with the second stator winding, the external energy source including at least one of a vehicle-to-load connection, a vehicle-to-house connection, and a vehicle-to grid connection; and
wherein during a charging mode of the vehicle, the second stator winding is adapted to consume energy from the external energy source, the power transfer occurs from the second stator winding to the first stator winding, and the first stator winding is adapted to provide power to the vehicle battery.

3. The electric drive system of claim 1, further comprising:
a power source selectively couplable to the electric machine, the power source being adapted to transmit a direct current (DC) signal;
a power converter adapted to receive the DC signal;
a high-frequency rotary transformer electrically coupled to the power converter, the high-frequency rotary transformer having a stationary portion and a rotating portion such that an alternating current (AC) in the stationary portion induces an AC voltage in the rotating portion;
a rectifier adapted to receive the AC voltage from the rotating portion of the high-frequency rotary transformer, the rectifier being adapted to convert the AC voltage to DC voltage; and
a DC bus adapted to store the DC voltage from the rectifier.

4. The electric drive system of claim 1, further comprising:
a power source selectively couplable to the electric machine, the power source being adapted to transmit a DC signal;
a first DC-to-AC inverter and a second DC-to-AC inverter adapted to receive the DC signal for conversion to a respective AC current;

a first slip ring device and a second slip ring device adapted to receive the respective AC current from the first DC-to-AC inverter and the second DC-to-AC inverter, the electric machine having a stationary side and a rotating side; and wherein the first slip ring device and the second slip ring device are positioned such that the respective AC current flows from the stationary side to the rotating side, the multi-phase rotor windings being adapted to receive the respective AC current for generation of a rotor field.

5. The electric drive system of claim 1, further comprising:

a power source selectively couplable to the electric machine, the power source being adapted to transmit a DC signal;

a first DC-to-AC inverter and a second DC-to-AC inverter adapted to receive DC signal for conversion to a respective AC signal; and a rotary transformer having respective dual nodes adapted to receive the respective AC signal from the first DC-to-AC inverter and the second DC-to-AC inverter, the rotary transformer being adapted to transmit the respective AC signal to the multi-phase rotor windings.

6. The electric drive system of claim 3, further comprising:

a two-phase inverter adapted to receive the DC voltage from the DC bus, the DC voltage being converted through into the respective currents in the two-phase inverter; and wherein the first phase coil and the second phase coil are adapted to receive the respective currents from the two-phase inverter for generation of a rotor field.

7. The electric drive system of claim 6, further comprising:

a three-phase inverter adapted to receive the DC voltage from the DC bus, the DC voltage being converted through into respective currents in the three-phase inverter;

wherein the multi-phase rotor windings include a third phase coil; and wherein the first phase, the second phase coil and the third phase coil are adapted to receive the respective currents from the three-phase inverter for generation of a rotor field.

8. A vehicle comprising:

an electric drive system having an electric machine with a stator assembly and a rotor assembly, the stator assembly having a plurality of multi-phase stator windings, including a first stator winding and a second stator winding;

a first inverter adapted to feed the first stator winding;

a second inverter adapted to feed the second stator winding;

wherein the rotor assembly has multi-phase rotor windings, including a first phase coil and a second phase coil defining respective currents forming a combined rotating current vector, the respective currents being 90 electrical degrees apart;

a plurality of circuit legs operatively connected to the multi-phase rotor windings, each of the circuit legs having a respective first switch and a respective second switch;

a controller having a processor and a tangible, non-transitory memory on which instructions are recorded, the controller being adapted to modulate a phase and an amplitude of the combined rotating current vector through controlling a state of the respective first switch and the respective second switch;

wherein the electric machine being configured such that power transfer between the first stator winding and the second stator winding is achieved when the rotor assembly is stationary, by generating a rotor magnetic field that is synchronized with a stator magnetic field; and wherein the multi-phase rotor windings are excited with alternating current (AC) and a respective frequency of an AC rotor current is synchronized with the respective frequency of an AC stator current, thereby maintaining synchronization between the stator magnetic field and the rotating rotor magnetic field for power transfer without spinning the rotor assembly.

9. The vehicle of claim 8, further comprising:

a power source selectively couplable to the electric machine, the power source being adapted to transmit a direct current (DC) signal;

a power converter adapted to receive the DC signal;

a high-frequency rotary transformer electrically coupled with the power converter, the high-frequency rotary transformer having a stationary portion and a rotating portion such that an alternating current (AC) in the stationary portion induces an AC voltage in the rotating portion;

a rectifier adapted to receive the AC voltage from the rotating portion of the high-frequency rotary transformer, the rectifier being adapted to convert the AC voltage to DC voltage; and a DC bus adapted to store the DC voltage from the rectifier.

10. The vehicle of claim 8, further comprising:

a power source selectively couplable to the electric machine, the power source being adapted to transmit a DC signal;

a first DC-to-AC inverter and a second DC-to-AC inverter adapted to receive DC signal for conversion to a respective AC signal; and a rotary transformer having respective dual nodes adapted to receive the respective AC signal from the first DC-to-AC inverter and the second DC-to-AC inverter, the rotary transformer being adapted to transmit the respective AC signal to the multi-phase rotor windings.

11. The vehicle of claim 9, further comprising:

a two-phase inverter adapted to receive the DC voltage from the DC bus, the DC voltage being converted into the respective currents in the two-phase inverter; and wherein the first phase coil and the second phase coil are adapted to receive the respective currents from the two-phase inverter for generation of a rotor field.

12. The vehicle of claim 9, further comprising:

a three-phase inverter adapted to receive the DC voltage from the DC bus, the DC voltage being converted through into the respective currents in the three-phase inverter;

wherein the multi-phase rotor windings include a third phase coil; and wherein the first phase, the second phase coil and the third phase coil are adapted to receive the respective currents from the three-phase inverter for generation of a rotor field.

* * * * *